July 18, 1961 R. W. CARLSON ET AL 2,992,870
BRAKE CUP WITH EMBEDDED METAL INSERT
Filed Aug. 13, 1959 2 Sheets-Sheet 1
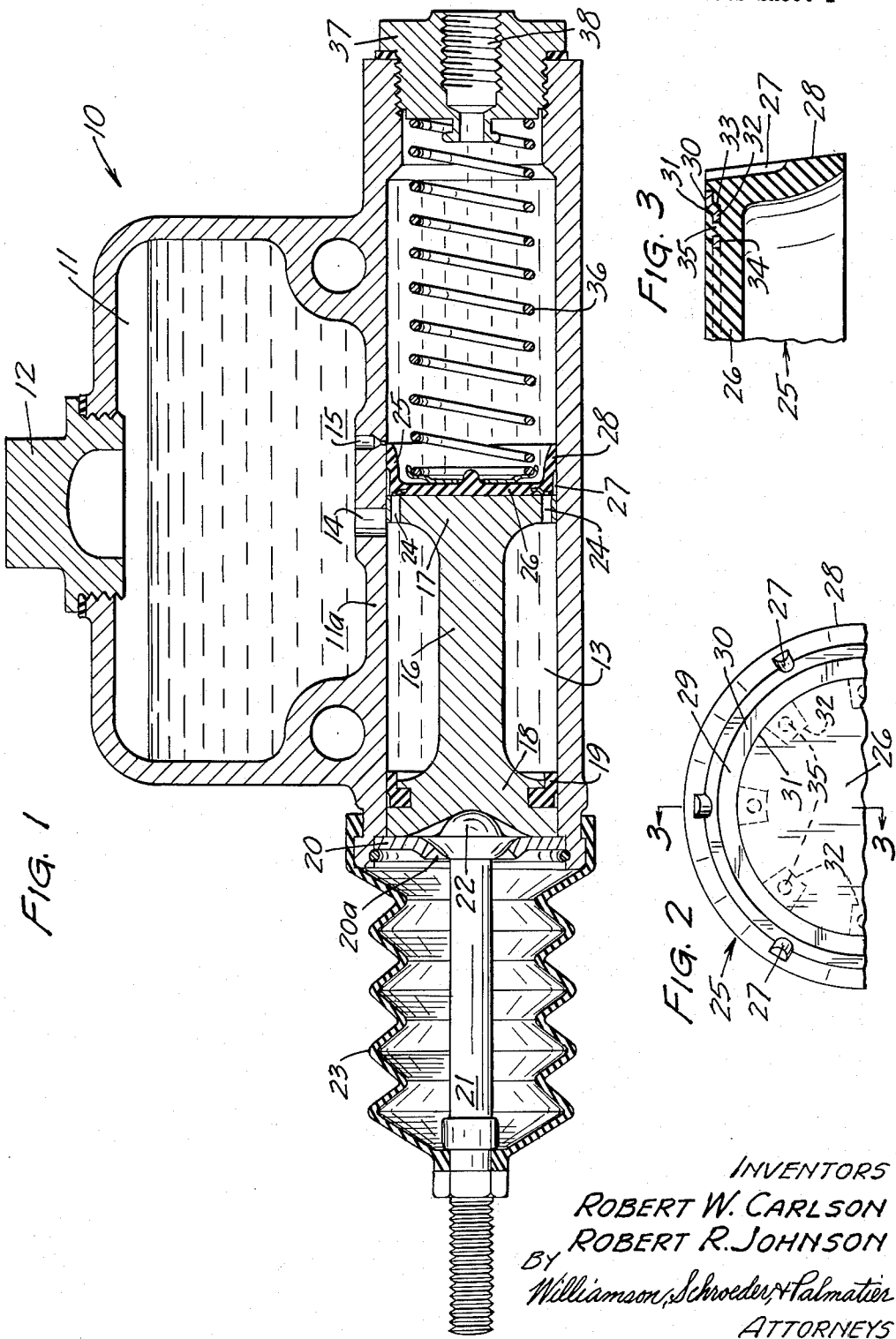
INVENTORS
ROBERT W. CARLSON
ROBERT R. JOHNSON
BY Williamson, Schroeder, & Palmatier
ATTORNEYS July 18, 1961 R. W. CARLSON ET AL 2,992,870
BRAKE CUP WITH EMBEDDED METAL INSERT
Filed Aug. 13, 1959 2 Sheets-Sheet 2
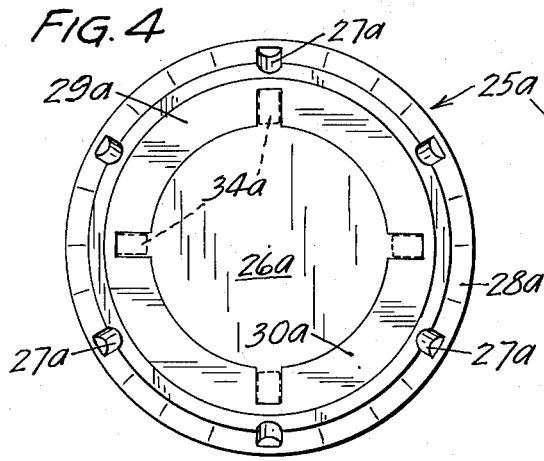
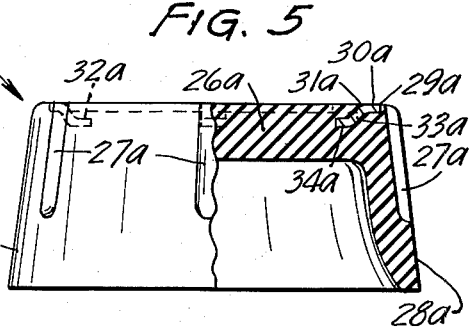
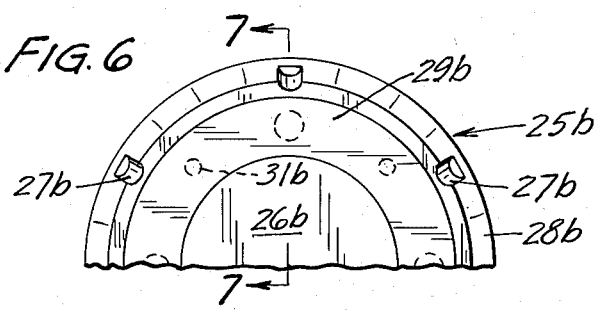
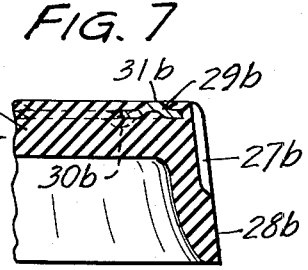
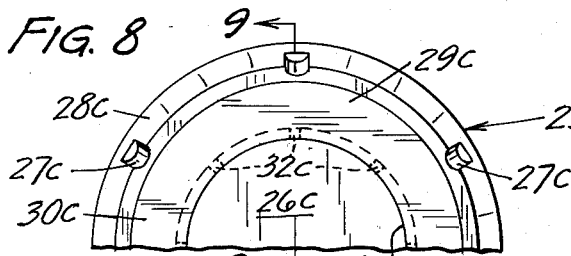
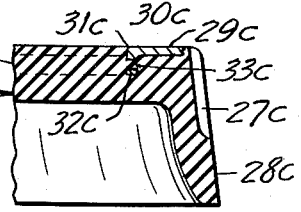
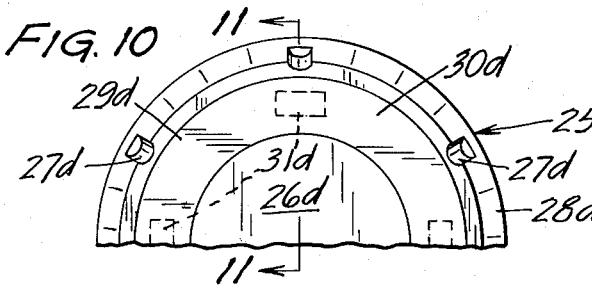
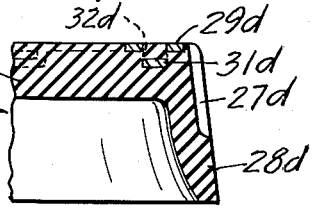
INVENTORS
ROBERT W. CARLSON
ROBERT R. JOHNSON
BY Williamson, Schroeder & Palmatier
ATTORNEYS "United States Patent Office" 2,992,870
Patented July 18, 1961

2,992,870
BRAKE CUP WITH EMBEDDED METAL INSERT
Robert W. Carlson and Robert R. Johnson, Edina, Minn., assignors to Minnesota Rubber Company, Minneapolis, Minn., a corporation of Minnesota
Filed Aug. 13, 1959, Ser. No. 833,619
8 Claims. (Cl. 309—33)

This invention relates to brake cups and more specifically to reinforced brake cups.

An object of this invention is to provide a novel and improved brake cup of simple and inexpensive construction.

Another object of this invention is to provide a novel and improved brake cup constructed and arranged to provide more efficient and reliable functions than were heretofore available.

Another object of this invention is to provide a novel and improved reinforced brake cup formed of flowable material such as rubber and reinforced in a manner as to substantially reduce the cost of manufacture.

A more specific object of this invention is to provide a novel and improved brake cup formed of flowable material such as rubber and having reinforcement arranged to preclude break through thereof.

Another object of this invention is to provide a novel and improved brake cup having reinforcement arranged and constructed to preclude complete collapse and sufficient to permit partial collapse while insuring proper, full and prompt return to sealing shape.

These and other objects and advantages of our invention will more fully appear from the following description made in connection with the accompanying drawings wherein like reference characters refer to the same or similar parts throughout several views and in which:

FIG. 1 is a longitudinal section of a master brake cylinder employing one embodiment of the novel brake cup;

FIG. 2 is an enlarged top plan view of a portion of one embodiment of the novel brake cup;

FIG. 3 is a cross sectional view on line 3—3 of FIG. 2 and looking in the direction of the arrows;

FIG. 4 is an enlarged top plan view of a different embodiment of the novel brake cup;

FIG. 5 is a side view partly in elevation and partly in section of the embodiment shown in FIG. 4;

FIG. 6 is an enlarged top plan view of a portion of another embodiment of the novel brake cup;

FIG. 7 is a cross sectional view taken on line 7—7 of FIG. 6 and looking in the direction of the arrows;

FIG. 8 is an enlarged top plan view of a portion of a different embodiment of the novel brake cup;

FIG. 9 is a cross sectional view taken on line 9—9 of FIG. 8 and looking in the direction of the arrows;

FIG. 10 is an enlarged top plan view of a portion of the further embodiment of the novel brake cup; and FIG. 11 is a cross sectional view on line 11—11 of FIG. 10 and looking in the direction of the arrows.

Referring now to the drawings, FIG. 1 shows a longitudinal section of a master cylinder, generally designated as 10, used in hydraulic brake systems of vehicles and incorporating one embodiment of the present invention. Although master cylinder 10 is of a conventional type, various details thereof will be described to better understand the present invention.

Master cylinder 10 includes a reservoir 11 provided with a filler cap 12 and also includes a cylinder 13. A pair of ports 14 and 15 are formed in a lower wall 11a of reservoir 11 and permits brake fluid to flow between reservoir 11 and cylinder 13 during the braking operation.

A piston 16 is positioned within cylinder 13 and is provided with an enlarged piston head 17 and an enlarged rear portion 18 having a sealing cup 19 which is in fluid sealing relation with the rear wall portions of cylinder 13. The rear end of cylinder 13 is provided with a closure member 20 having an opening 28 formed therein for receiving a plunger 21 which is in turn interconnected to a foot pedal, not shown. A dust seal 23 is secured to the rear end of master cylinder 10 and encloses a portion of plunger 21 therein to thereby prevent dust or the like from entering the interior of cylinder 13. It will also be noted that piston head 17 is provided with a plurality of axially arranged apertures 24 which permit the passage of brake fluid therethrough during the return stroke of the piston.

The preferred embodiment of the novel brake cup, generally designated as 25, is shown positioned in place against piston head 17. Referring now to FIGS. 2 and 3, it will be seen that brake cup 25 is of generally frusto-conical shape and is formed of flowable material such as rubber. Brake cup 25 has its larger end open and its smaller end closed as at 26 and is provided with a plurality of circumferentially arranged grooves 27. Brake cup 25 is also provided with an annular sealing lip 28 which engages the inner circumferential wall of the cylinder 13 in sealing relation. An annular back-up member 29 formed of metallic material is embedded within and bonded to the closed end 26. It will be noted that back-up member 29 has a smaller circumference than the circumference of the brake cup 25 so that the rubber material of the brake cup more effectively anchors the back-up member.

Brake cups of the type described are formed by high pressure injection molding. Back-up member 29 is positioned against the surface of the mold which forms closed end 26 so that when the molding process is complete an annular surface 30 of back-up member 29 is left exposed. The inner circumferential edge 31 of back-up member 29 has a plurality of anchor tabs 32 extending axially therefrom as at 33 and each of which terminates in a radially extending portion 34. Each of the radially extending portions 34 of anchor tabs 32 are provided with an aperture or perforation 35 through which the rubber material flows during the molding process. It will be seen in FIG. 3 that anchor tabs 32 are completely embedded in the material of closed end 26 to thereby positively bond back-up member 29 thereto.

A coil spring 36 has one end thereof positioned within and against the closed end portion of the brake cup 25 and has the other end thereof bearing against a cap member 37 which is secured to cylinder 13. Cap member 37 is provided with a fluid discharge outlet 38 which serves to distribute fluid therethrough to conduits of the brake system. When the brake pedal, not shown, is depressed axial thrust is transmitted through plunger 21 which in turn causes axial movement of piston 16 in cylinder 13. Forward movement of piston 16, of course, causes corresponding movement of brake cup 25 which because of its sealing relation with inner walls of cylinder 13 forces the brake fluid through discharge outlet 38 and into the conduits of the brake system. Port 15 permits some fluid to pass therethrough in the manner of a relief valve to thereby relieve excess pressure during the very initial portions of this operation and thereby prevent rupture of the hydraulic system.

During the return stroke of piston 16, which is urged rearwardly by spring 36, and various other resilient means (not shown) connected to the plunger 21, brake fluid passes from the area around the restricted portion as shown of the piston 16 through aperatures 24 and into grooves 27 of brake cup 25 to thereby cause the circumferential walls of the cup to buckle inwardly. The inward buckling of the circumferential walls of the brake cup 25 moves the sealing lip 28 out of sealing relation with the interior cylinder wall and thereby facilitates free flow of the fluid through apertures 24 and thereby the return of the piston 16.

As is well known in the art, a small clearance is left between the outer circumferential surface of piston head 17 and the inner circumferential walls of cylinder 13. Rubber brake cups of the conventional type heretofore known, because of the flowable characteristics of rubber, tend to extrude into this space when subjected to fluid pressure on the forward stroke of piston 16. This extrusion causes wear or nippling of the brake cups adjacent this area and consequent weakening which eventually results in complete rupture and/or permanent collapse of the brake cup. Back-up member 29 greatly minimizes the tendency of the brake cup to extrude since it reinforces and rigidifies the brake cup adjacent its circumferential area and thus a brake cup of our construction not only operates more efficiently but has a longer useful life span.

During the return stroke of the piston, the brake fluid passes through apertures 24 of piston head 17 with great pressure and in some instances causes brake cups formed solely of rubber material to deform and sometimes rupture at circumferential portions thereof. It will be noted that back-up member 29 is disposed directly in front of apertures 24 when the brake cup 25 is positioned in place. Thus, the brake cup member 25 is reinforced at its circumferential portions at the very points at which it is subjected to the most extreme strain, back-up member 29 preventing any break through or rupture thereat.

Another disadvantage found in brake cups formed solely of rubber material is the failure of the circumferential walls of the brake cup to return fully and promptly to their sealing relation with the cylinder. If the brakes are pumped so that piston 16 moves forwardly, then returned, and thereafter again moved forwardly quickly and the brake cup is in non-sealing relation with the inner walls of cylinder 13, there will be no braking action since the fluid will pass around the brake cup. Back-up member 29 rigidifies and reinforces the circumferential portions of brake cup and causes the circumferential walls thereof and sealing lips 28 to collapse to a lesser degree and to return completely and promptly into sealing relation with the cylinder walls.

Referring now to FIGS. 4 and 5, another embodiment of our novel brake cup is shown and is generally designated 25a. Brake cup 25a is also formed of flowable material such as rubber and is of substantially frusto-conical shape. Brake cup member has a closed smaller end 26a and an open larger end is also provided with a plurality of circumferentially arranged grooves 27a. A sealing lip 28a is provided adjacent the larger open end thereof which is adapted to be in sealing engagement with the inner circumferential wall of the cylinder.

Brake cup 25a is also provided with an annular back-up member 29a formed of metallic material and which is embedded in the closed end 26a during the molding operation to thereby leave an exposed annular surface 30a in the manner of the embodiment of FIGS. 2 and 3. A plurality of anchor tabs 32a extend from the inner circumferential edge 31a of back-up member 29 and each includes an axially extending portion 33a and a radially extending portion 34a. Each of the anchor tabs 32a are completely embedded within the closed end 26a to thereby securely anchor the back-up member 29a to brake cup 25a. It will also be noted that back-up member 29 has a circumference less than the circumference of the brake cup 25a so that annular surface 30a is the only exposed portion of the back-up member.

FIGS. 6 and 7 disclose a further embodiment of the invention and includes a frusto-conical shape brake cup 25b formed of flowable material such as rubber and having an open larger end and a closed smaller end 26b. Brake cup 25b is also provided with a plurality of circumferentially arranged grooves 27b and an annular sealing lip 28b in the manner of the previously described embodiments. An annular back-up member 29b formed of metallic material, is embedded within the closed end 26b and includes a plurality of protuberances or humps 30b extending axially therefrom and towards the open larger end of brake cup 26b. Back-up member 29b also includes a plurality of protuberances or humps 31b extending axially from an annular surface thereof in an opposite direction than humps 30b. Back-up member 29b is embedded within the closed end 26b during the injection molding process and humps 31b serve to space the back-up member from the lower surface of the mold to thereby permit the back-up member to be embedded within the material of the closed end 26b. It will also be noted that the circumference of annular back-up member 29b is substantially less than the circumference of the brake cup so that the material flows completely around the inner and outer circumferential edges of the back-up member. Referring now to FIG. 6, it will be seen that annular member 29b does not have an annularly exposed surface and only a small portion of protuberances 31b are exposed.

A further embodiment of our invention is shown in FIGS. 8 and 9 and includes a brake cup member 25c which is also of frusto-conical shape and which is formed of a flowable material such as rubber or the like. Brake cup member 25c also has its larger end open and a smaller end closed as at 26c and is provided with a plurality of circumferentially arranged grooves 27c. Brake cup 25c is also provided with an annular sealing lip 28c which is adapted to engage the inner circumferential wall of a master brake cylinder in sealing relation thereto. Brake cup 25c is also provided with an annular back-up member 29c which is embedded therewithin during the injection molding process and which includes an exposed annular surface 30c. The inner circumferential edge 31c of back-up member 29c is provided with a plurality of axially extending anchor tabs 32c having an opening 33c formed therein. Referring now to FIG. 9, it will be seen that anchor tabs 32c are embedded within the end 26c with portions of the latter extending through the opening or perforations 33c to thereby positively anchor the back-up member 29c to the brake cup.

Referring now to FIGS. 10 and 11 which shows a further embodiment of our invention and includes a brake cup 25d which is also of frusto-conical shape and is formed of a flowable material such as rubber or the like. Frusto-conical brake cup 25d also has its smaller end closed as at 26d and has its larger end opened in the manner of the previously described embodiments. Brake cup 25d is also provided with a plurality of circumferentially arranged slots 27d and an annular sealing lip 28d which is adapted to engage the inner circumferential walls of the master cylinder in sealing relation.

An annular back-up member 29d is embedded within the brake cup 25d during the injection molding process and has an exposed annular surface 30d and a plurality of anchor tabs 31d in the form of extruded bridges. The extruded bridges or anchor tabs 31d extend axially from the embedded annular surface of back-up member 29d towards the open end of the brake cup 25d. It will be noted that the extruded bridges 31d are substantially U-shaped and the bight portion 32d thereof securely anchors the back-up member against any axial movement. It is also pointed out that the circumference of back-up member 29d is slightly less than the circumference of the closed end 26d of brake cup member 25d. Thus, it will be seen that back-up member 29d is completely embedded within portions of brake cup 25d with only annular surface 30d exposed.

It will therefore be seen from the preceding paragraphs that we have provided a novel brake cup having reinforcement which precludes any break through whatsoever adjacent its circumferential portions. Thus, this uniquely reinforced brake cup has a much longer period of wear and thus obviates the necessity of constant maintenance of the master cylinder or replacement of the same.

It will also be seen from the foregoing description that the molding of the brake cup and the bonding of the metallic insert thereto is done simultaneously which results in a relatively inexpensive operation. It will also be seen that the annular metallic insert is so securely bonded to the brake cup that there is little chance of separation therefrom. This non-separating feature permits the master brake cylinder to be assembled without the loss of time incurred when a back-up member becomes separated from the brake cup.

It will also be noted from the preceding description that the long existing problem of nibbling or wear of the brake cup, which results when the circumferential portions of the brake cup extrude during the forward stroke of the piston, is greatly reduced. This tendency of the rubber material to extrude is greatly minimized due to the unique reinforced construction of our novel brake cup.

It will be noted from the foregoing description that our novel brake cup is provided with reinforcement constructed and arranged to cause the brake cup to completely and rapidly return to its fluid sealing shape after partial collapse thereof during the return stroke of the piston. Heretofore conventional brake cups failed to completely return to their sealing relation after buckling which resulted in an ineffective braking action. This problem is completely non-existent with our novelly constructed brake cup which is sufficiently flexible to flex or buckle during the return stroke of the piston and is of sufficient rigidity to cause rapid and complete return of the brake cup into sealing relation with the circumferential walls of the cylinder. Thus, it will be seen that we have provided a novel brake cup which may be manufactured economically, which effectively resists the wear and failure that characterizes conventional rubber brake cups and which is of such inherent construction so as to permit reliable and efficient functioning thereof.

It will, of course, be understood that various changes may be made in the form, details, arrangement and proportions of the parts without departing from the scope of our invention which consists of the matter shown and described herein and set forth in the appended claims.

What is claimed is:

1. A master cylinder brake cup comprising, a frusto-conically shaped cup-shaped member formed of flowable material such as rubber, said member having an open larger end and a closed smaller end, an annular rigid metal back-up element embedded in said closed end and having an exposed annular surface facing away from said open end, said annular element having a plurality of spaced rigid perforated anchor tabs extending axially inwardly from the inner circumferential portion thereof, said anchor tabs being embedded within said closed end to thereby positively anchor said annular element to said member and cooperatively provide support for the peripheral areas of said closed end to preclude break-through thereat.

2. A master cylinder brake cup comprising, a frusto-conically shaped cup-shaped member formed of flowable material such as rubber, said member having an open larger end and a closed smaller end, an annular rigid metal back-up element embedded in said closed end and having an exposed annular surface facing away from said open end, said annular element having a plurality of spaced rigid anchor tabs extending axially inwardly from the inner circumferential portion thereof, said anchor tabs being embedded within said closed end to thereby positively anchor said annular element to said member and cooperatively provide support for the peripheral areas of said closed end to preclude break-through thereat, each of said anchor tabs comprising a bridge.

3. A master cylinder brake cup comprised of a generally frusto-conical cup-shaped member formed of resilient flowable material such as rubber, said member having an open larger end and a closed smaller end portion, and an annular rigid metallic back-up element molded in embedded relation within said smaller end portion and having an exposed annular surface facing away from said open end, said annular element having a plurality of spaced rigid perforated anchor tabs extending axially inwardly from the inner circumferential portion thereof, said tabs being embedded within the body of said member with portions of the latter extending through the perforations of the tabs to positively anchor said member to said element.

4. A master cylinder brake cup comprised of a generally frusto-conical cup-shaped element formed of a resilient flowable material such as rubber, said element having an open larger and a closed smaller end portion, and an annular rigid metallic back-up member molded in embedded relation with said smaller end portion and being only slightly smaller in circumference, said annular member having a plurality of spaced rigid anchor tabs extending radially inwardly from the inner circumferential portions of the back-up member, said tabs being embedded within said closed end portion to thereby positively anchor said annular member to said element and to cooperatively provide support for the peripheral edge of said closed end to preclude break through thereat.

5. A master cylinder brake cup comprised of a generally frusto-conical cup-shaped element formed of flowable material such as rubber, said element having an open larger and a closed smaller end portion, an annular rigid metallic back-up member molded in embedded relation with said smaller end portion and having an exposed annular surface facing away from said open end, said annular member having a plurality of spaced rigid anchor tabs extending first axially and then radially inwardly from the inner circumferential portion of the annular member, said tabs being embedded within said closed end to positively anchor said member to said element and to thereby provide support for the peripheral edge of said closed end to preclude break through thereat.

6. The structure as defined in claim 5 wherein the radially extending portions of said tabs are perforated with portions of the closed end extending through the perforations.

7. A master cylinder brake cup comprised of a generally frusto-conical cup-shaped element formed of a resilient flowable material such as rubber, said element having an open larger and a closed smaller end portion, and an annular rigid metallic back-up member molded in embedded relation with said smaller end portion and being only slightly smaller in circumference, said annular member having a plurality of spaced rigid humps extending axially therefrom, said humps being embedded within said closed end to thereby positively anchor said annular member to said element to thereby provide support for the peripheral edge of said closed end to preclude break through thereat.

8. A master cylinder brake cup comprising a generally frusto-conical cup-shaped element formed of a flowable material such as rubber, said element having an open larger and a closed smaller end portion, and an annular rigid metallic backup member molded in embedded relation with said smaller end portion and being only slightly smaller in circumference, said annular member having a plurality of spaced rigid anchor tabs extending axially therefrom, said tabs being enclosed within said closed end portion to thereby more effectively anchor said annular member to said element and to cooperatively provide support for the peripheral edge of the said closed end to preclude break-through thereat.

(References on following page)

References Cited in the file of this patent

UNITED STATES PATENTS

| | | | |
|---|---|---|---|
| 2,051,262 | MacClatchie | Aug. 18, 1936 |
| 2,054,863 | Oliver | Sept. 22, 1936 |
| 2,325,556 | Taylor et al. | July 27, 1943 |
| 2,385,406 | Dayton | Sept. 25, 1945 |
| 2,459,562 | La Brie | Jan. 18, 1949 |
| 2,600,516 | Pielop | June 17, 1952 |
| 2,687,335 | Bowerman | Aug. 24, 1954 |
| 2,723,721 | Corsette | Nov. 15, 1955 |
| 2,832,654 | Carufel | Apr. 29, 1958 |
| 2,884,292 | Doner | Apr. 28, 1959 |
| 2,918,336 | Works et al. | Dec. 22, 1959 |